(12) United States Patent
Martin et al.

(10) Patent No.: US 6,497,243 B1
(45) Date of Patent: Dec. 24, 2002

(54) ASSEMBLY OF FUEL SYSTEM COMPONENTS ON A FUEL TANK

(75) Inventors: Charles J. Martin, Ann Arbor, MI (US); Gill E. Eisenstein, Lake Zurich, IL (US); Kenneth M. Spink, Jerome; James R. Jamrog, Novi, both of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/705,181

(22) Filed: Nov. 2, 2000

(51) Int. Cl.[7] .................................................. F16L 55/18
(52) U.S. Cl. ............................ 137/15.09; 137/315.01; 137/590; 251/367; 251/368; 251/144
(58) Field of Search .......................... 123/516; 251/144, 251/368, 367; 137/590, 587, 315.01, 15.09

(56) References Cited

U.S. PATENT DOCUMENTS 4,590,964 A * 5/1986 Beardmore .................. 137/565
5,954,091 A * 9/1999 Leadford ..................... 137/587

* cited by examiner

*Primary Examiner*—A. Michael Chambers
(74) *Attorney, Agent, or Firm*—Roger A. Johnston

(57) ABSTRACT

Apparatus and method of assembling an interior fuel systems component suitable for immersion in liquid fuel in a tank to an exterior component of different material weldable to the fuel tank. The exterior component is preferably formed of HDPE having a hardness in the range of about RR-40 to RR-80 and has an array of projections extending therefrom. The interior component has a corresponding array of radially extending slots having barbed edges for push on connection to the projections. The slots permit sliding movement due to material swelling of the projection on the barbs without loosening of the connection. The internal component is preferably formed of material comprising a member of the group consisting of Polyamide, Polyketone and Polyphenylamide and having a hardness in the range of about R112, such that the barbs deform the lugs to maintain the connection.

14 Claims, 3 Drawing Sheets

ASSEMBLY OF FUEL SYSTEM COMPONENTS ON A FUEL TANK

CROSS-REFERENCE TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable.

BACKGROUND OF THE INVENTION

The present invention relates to fuel system components such as, for example, fuel vapor flow control valves for use in liquid fuel tanks employed in motor vehicles. In present production of passenger and light truck vehicles, it is required to have valves for controlling the flow of fuel vapor from the fuel tank to a storage canister and also to provide valves capable of closing the vent in the event the vehicle is tipped beyond a threshold amount or rolled from the upright position. In providing such components in vehicle fuel tanks, problems have been encountered in forming the components of materials which are acceptably dimensionally stable when immersed in the fuel and yet which are compatible with the fuel tank. The choice of the materials for the fuel tank is generally dictated by the fabricating processes employed and a need for materials which may be welded together. Unfortunately, it has been found that the properties of the materials employed for the components immersed in the fuel are not compatible with welding attachment to the fuel tank materials.

In order to provide attachment to the fuel tank of such fuel vapor system components in a manner which will produce a robust and leak-proof attachment, it has been desired to weld the components onto the tank after assembly over an access opening in the tank. Thus, the material of the attached external component must be weldable to the tank material. Where the tank is formed of resinous or plastic material, it has been found virtually impossible to match the properties of the interior immersed components with those of the attachment components and to provide the requisite mechanical and fuel resistant properties needed for the immersed components. Therefore, it has long been desired to provide a way or means of attaching fuel system components which are designed for immersion in the fuel to the remaining components of the system which are designed to be attached and secured onto the tank by weldment. The problem has been particularly acute in finding a way or means of attaching fuel vapor flow control valves and rollover valves to fuel tanks formed of plastic material.

BRIEF SUMMARY OF THE INVENTION

The present invention provides a solution to the problem of attaching fuel system components to a fuel tank where the components intended to extend interiorly of the tank and immersed in the fuel are formed of different material from the components intended for attachment exteriorly of the tank and particularly those intended for attachment to the tank by weldment.

The present invention employs an exterior component formed of material suitable for weldment to a fuel tank and an interior component formed of different material suitable for prolonged immersion in the liquid fuel in the tank in which the interior component is attached to the exterior component prior to assembly onto the tank. The present invention employs an exterior component which has a plurality of projections or lugs extending downwardly therefrom in a spaced array; and, the interior component has a correspondingly spaced array of radially extending slots with the sides of the slots having engagement surfaces, preferably barbs formed thereon for push-in attachment over the lugs on the exterior component. The barbs are preferably of harder material and deform the lugs to retain them in position. The radial slots with their barbed edges permit swelling and expansion of the immersed component and sliding of the lugs on the barbs without weakening or loosening of the engagement of the barbs on the projecting lugs.

DETAILED DESCRIPTION OF THE INVENTION

Figure 1:
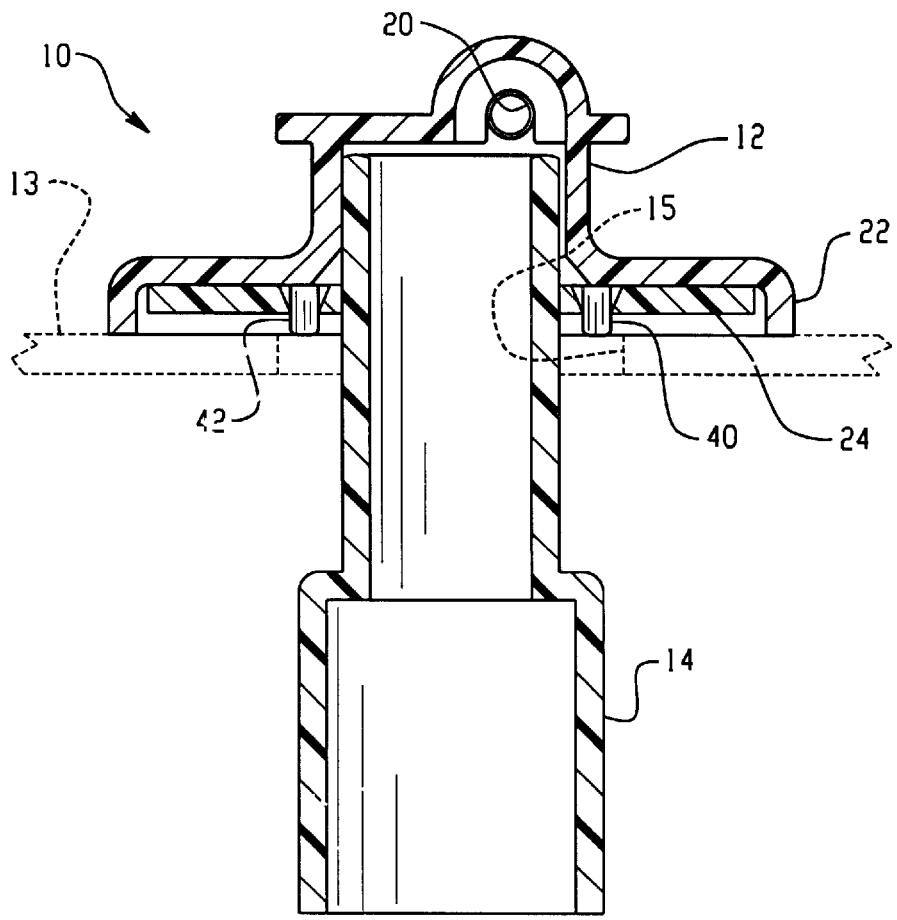
FIG. 1 is a cross-sectional view of the assembled components of the invention as installed in an access opening in a fuel tank wall shown in dashed outlines.
Figure 2:
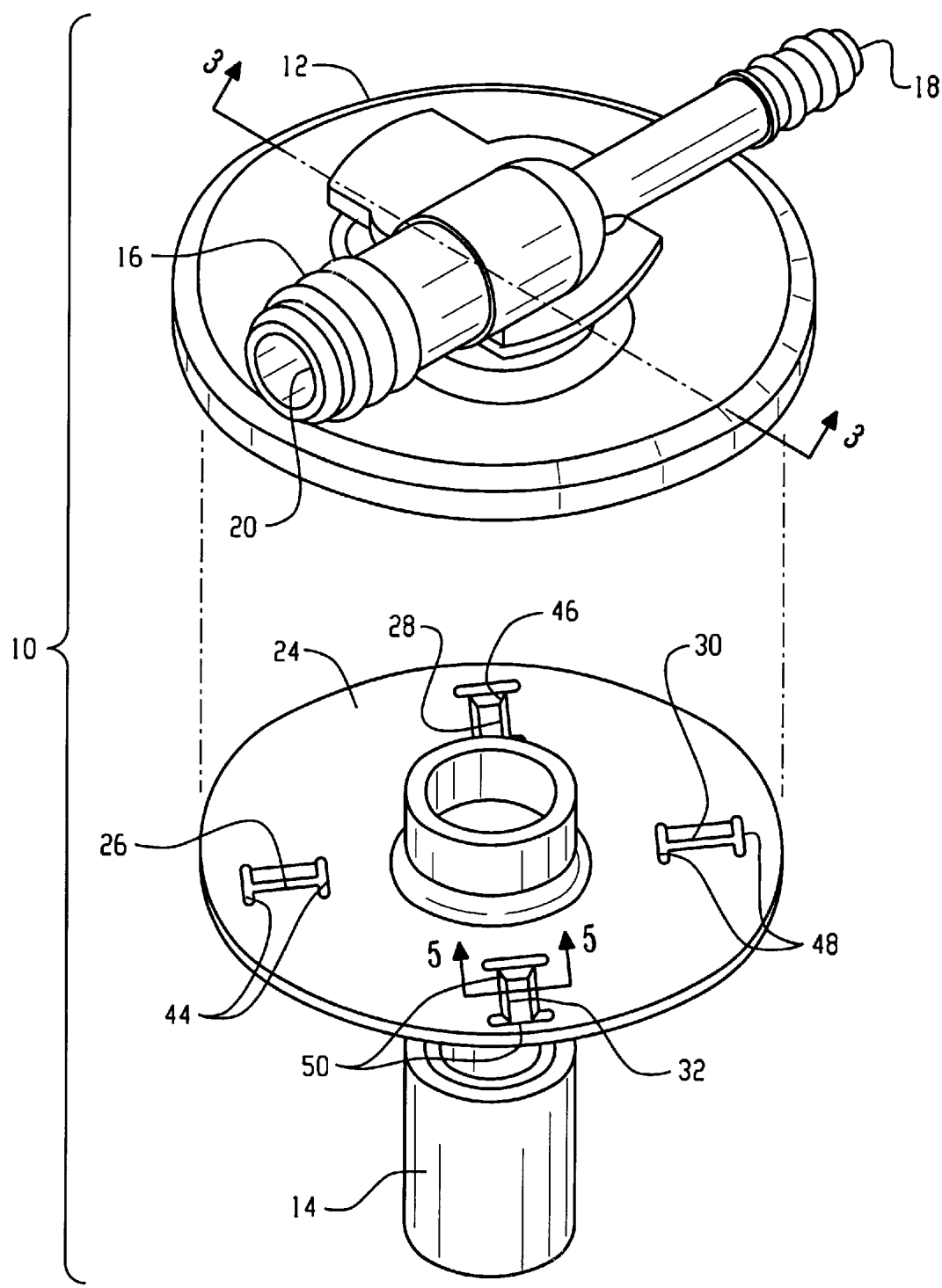
FIG. 2 is an exploded view of the assembly of FIG. 1.

Referring to FIGS. 1 and 2, the assembly of the present invention is indicated generally at 10 which includes an exterior component 12 formed of material suitable to attachment to the exterior surface of a fuel tank 13 shown in dashed outline in FIG. 1 by weldment. In the present practice of the invention the component 12 is typically formed of High Density Polyethylene material. An internal component indicated at 14 extends downwardly through an attachment opening 15 indicated in dashed outline in FIG. 1 in the top wall of the fuel tank and is intended for continuous immersion in the liquid fuel (not shown) within the tank.

The exterior component 12 typically has fuel vapor hose connectors 16, 18 provided on the exterior side thereof which are ported, such as by port 20, formed on connector 16 for providing flow of vapor through a connecting hose (not shown) to other components of the fuel vapor system. The port 20 connects to a passageway 32 (see FIG. 3) opening to the underside of component 12.

The component 12 has an annular flange 22 formed about the periphery thereof which is adapted for attachment by weldment to the upper surface of the top wall of the fuel tank 13 shown in dashed outline in FIG. 1. This may be accomplished ultrasonically, by hot plate welding or by friction welding of the flange 22 directly to the tank 13.

Figure 5:
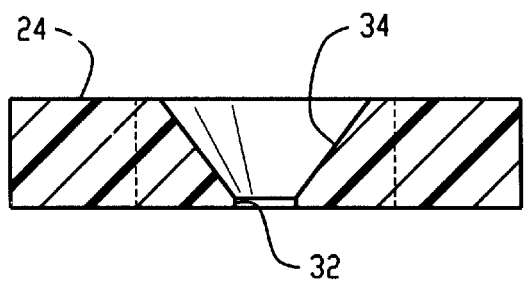
FIG. 5 is a section view taken along section-indicating lines 5—5 of FIG. 2.

Referring to FIGS. 2 and 5, the interior component 14 has a radially outwardly extending annular flange 24 formed thereon which has a plurality of radially outwardly extending slots 26, 28, 30, 32 formed thereon in a circumferentially spaced array as shown in FIG. 2.

Referring to FIG. 5, the slot 32, which is typical of all the slots, is shown in cross-section as having at least one substantially sharpened edge or barb formed thereon, preferably located at the lower edge thereof by a suitable chamfer 34.

Referring to FIG. 2, it will be seen that each of the slots 26, 28, 30, 32 is relieved at the ends thereof as denoted by reference numerals 44, 46, 48, 50 respectively in order to provide resilience or deflectability to the barbed edges of the slots upon insertion of the lugs 36, 38, 40, 42 therein.

In the present practice of the invention, it has been found satisfactory to form the interior component of material comprising a member of the group consisting of Polyamide, Polyketone and Polyphenylamide and having a hardness in the range of about R112; however other suitable materials may be employed if compatible with prolonged immersion in the liquid fuel.

Figure 3:
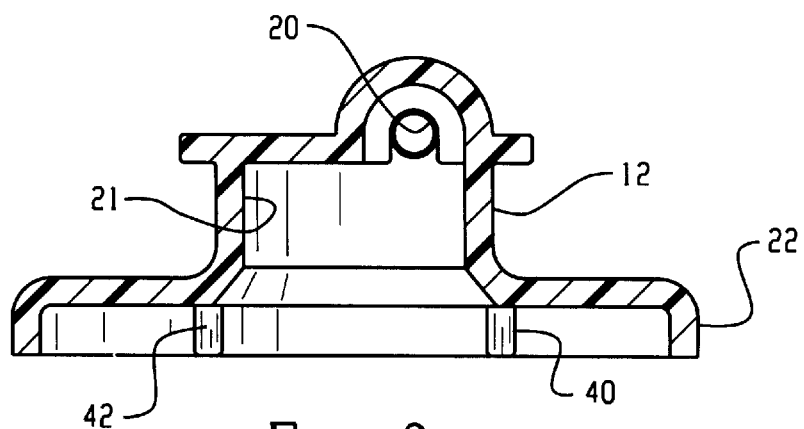
FIG. 3 is a cross-section of the external component of the assembly of FIG. 1 taken along section indicating lines 3—3 of FIG. 2.
Figure 4:
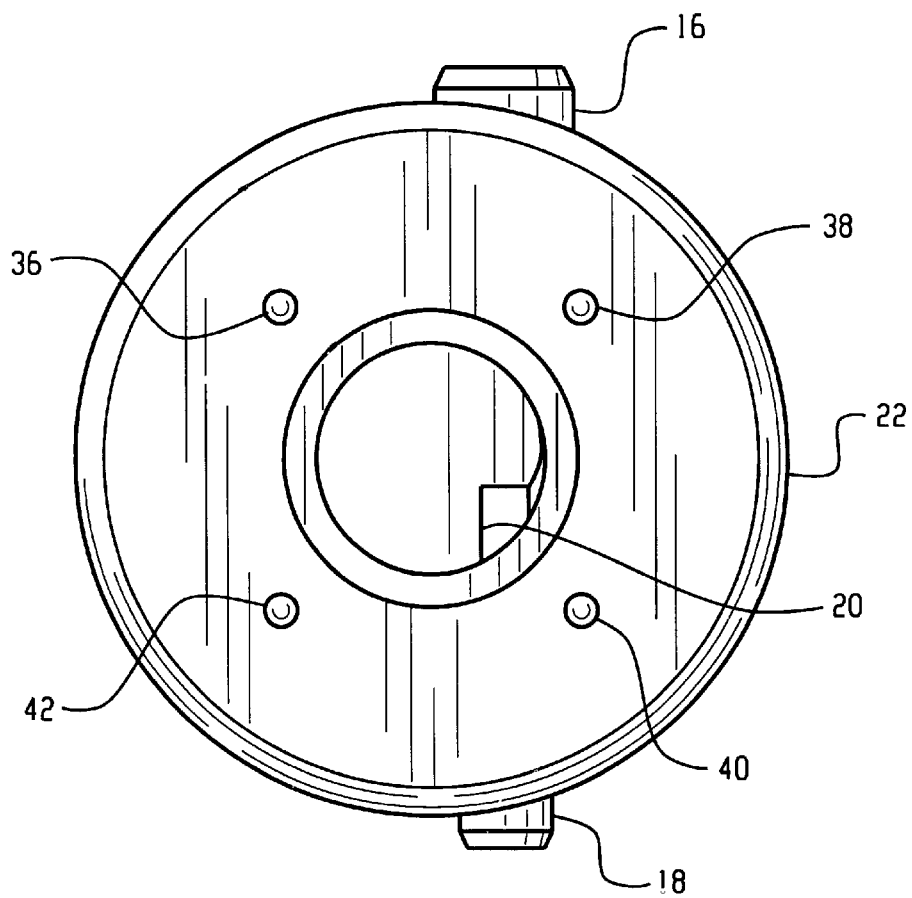
FIG. 4 is a bottom view of FIG. 3.

Referring to FIGS. 1, 3 and 4, the exterior component 12 is shown as having a plurality of downward extending lugs or projections 36, 36, 40, 42 formed on the undersurface thereof in a spaced array, preferably radially and circumferentially equally spaced. Each of the lugs 36, 38, 40, 42 has the diameter thereof sized and configured to frictionally engage the barbs in the slots 26, 28, 30, 32 in a manner deflecting the edges of the slots and preventing withdrawal therefrom. In the presently preferred practice of the invention, the external component 12 is formed of High Density Polyethylene (HDPE) material having a hardness in the range of about RR-40 to RR-80.

In the event of swelling or expansion of the material of the interior component due to prolonged immersion in the fuel in the tank, the present invention permits the lugs 36, 38, 40, 42 to slidably move in the slots respectively 26, 28, 30, 32 without loosening engagement of the barbed edges of the slots with the lugs, thereby accommodating swelling of the internal component 14.

The present invention thus provides a novel and relatively low cost solution to the problem of attaching fuel system components to a fuel tank where the exterior components must be formed of materials suitable for weldment to the tank and wherein the interior component is suitable for continuous immersion in the liquid fuel.

Although the invention has hereinabove been described with respect to the illustrated embodiments, it will be understood that the invention is capable of modification and variation and is limited only by the following claims.

What is claimed is:

1. An assembly for venting fuel vapor from a tank comprising:
   (a) an exterior component formed of material weldable to the tank and having a fuel vent passage therethrough, said component con figured to cover an access opening in the tank and having at least one projection extending therefrom into said access opening;
   (b) an interior component formed of different material suitable for immersion in the fuel in the tank, wherein said interior component has a portion thereof having at least one corresponding slot formed therein with said slot(s) engaging said projection(s) in push-on engagement whereby the material of said projection(s) is deformed to maintain the connection.

2. The assembly defined in claim 1, wherein said slots have at least one barb formed on the edge thereof.

3. The assembly defined in claim 1, wherein said slots have the ends thereof relieved and a barb formed on at least one edge thereof.

4. The assembly defined in claim 1, wherein said exterior component is formed of High Density Polyethylene (HDPE) and said interior component is formed of material comprising a member selected from the group consisting of Polyamide, Polyketone and Polyphenylamide.

5. The assembly defined in claim 1, wherein said slots and lugs are disposed in a radially and circumferentially equally spaced array.

6. A method of mounting an interior fuel immersible component to an exterior component of different material weldable to a fuel tank comprising:
   (a) providing an exterior component and forming a plurality of projections spaced in a pattern and extending from the underside of said weldable exterior component;
   (b) providing an interior component and forming a plurality of slots extending radially with respect to said pattern in said non-weldable interior component and forming engagement surfaces on the side of the slots;
   (c) inserting said lugs in the slots and engaging each of said projections with the engagement surfaces of one of said slots by push-on connection;
   (d) slidably absorbing movement of said projections in the direction of said slots and retaining said projections securely engaged in said slots; and,
   (e) inserting said interior component in an access opening in said tank and welding said exterior member to said tank over said opening.

7. The method defined in claim 6, wherein said step of forming engaging surfaces included chamfering opposite edges of said slots and forming barbs thereon.

8. The method defined in claim 6, wherein said step of forming a plurality of projections includes injection molding.

9. The method defined in claim 1, wherein said step of forming a component includes forming a component having hose connectors thereon extending exteriorly of the tank.

10. The method defined in claim 6, wherein said step of forming said projections includes forming said projections at a uniform radial distance and circumferentially equally spaced array.

11. The method defined in claim 6, wherein said step of forming a weldable component includes forming an exterior hose connector and said step of inserting includes porting said weldable member to said hose connector.

12. The method defined in claim 6, wherein said step of forming engagement surfaces in said slots includes relieving the ends of said slots.

13. The method defined in claim 6 wherein said step of engaging said lug in said slots includes deforming the material of said lugs.

14. The method defined in claim 6, wherein said step of providing an exterior component includes forming a member of High Density Polyethylene having a hardness in the range of about RR-40 to RR-80; and, said step of providing an interior component includes forming a component of material comprising a member selected from the group consisting of Polyamide, Polyketone and Polyphenylamide and having a hardness in the range of about R112.

* * * * *